H. C. H. SMYTH.
ELECTRIC GENERATOR FOR LIGHTING MOTOR CARS.
APPLICATION FILED OCT. 26, 1915.
1,323,111.
Patented Nov. 25, 1919.
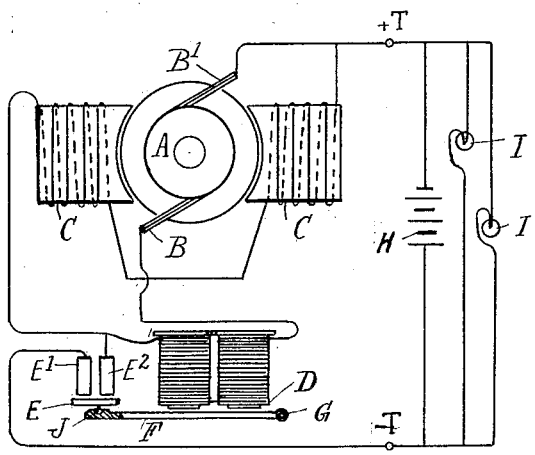

UNITED STATES PATENT OFFICE.

HERBERT CHARLES HUMPHREY SMYTH, OF LONDON, ENGLAND.

ELECTRIC GENERATOR FOR LIGHTING MOTOR-CARS.

1,323,111.   Specification of Letters Patent.   Patented Nov. 25, 1919.

Application filed October 26, 1915. Serial No. 58,079.

*To all whom it may concern:*

Be it known that I, HERBERT CHARLES HUMPHREY SMYTH, a subject of the King of England, residing at London, in the Kingdom of England, have invented new and useful Improvements in Electric Generators for Lighting Motor-Cars, of which the following is a specification.

This invention relates to the construction of a cut-in and cut-out device for use in conjunction with electric generators for charging accumulators, where it is understood that the generator for this purpose should only be capable of supplying current to the accumulators when its terminal voltage is greater than the accumulator voltage.

According to my invention I provide a cut-in and cut-out device having a single winding on its coil and the circuits so arranged that the current supplied to the field winding of the generator is directed through the coil of this device in a certain direction, and when this current reaches a predetermined value, contact is made at the cut-in device so that the generator can supply current to the accumulators which current also passes through the aforesaid coil of my device in the same direction as the aforesaid field current. And furthermore after this contact is made, should the voltage of the generator (from any cause) fall below that of the accumulators, a current would tend to flow from the accumulators through the coil of my device in an opposite direction to the aforesaid field current and thus cause contact to be broken at such a moment when the voltage of the generator and the voltage of the accumulators are of equal value, thus practically preventing any discharge from the accumulators and breaking the contact at a moment when no current is flowing thereby preventing sparking at the contacts.

The accompanying drawing is a diagrammatic view showing the arrangement of circuits both inside the generator and also the external circuit which includes the device, accumulators and lamps.

In the diagram, the letter A denotes the armature of the dynamo; B, B¹ the brushes; C, C the field coils; D the coil and E the contact of the device for making and breaking the circuit between the terminals +T and —T of the dynamo.

The letters H and I designate the accumulators and the lamps respectively which form parts of the external circuit.

When the armature begins to generate a current the latter will pass through the circuit B¹, C—C, D, B and as soon as it reaches a predetermined value the keeper F will be attracted and make contact between the blocks E, E¹, E² and which will cause a current to also flow to the external circuit through B¹, +T, H or I, —T, E¹, E, E², D, B, through the coil D in the same direction as the same aforesaid field current, and thus strengthens the attraction of the keeper F and also the contact between the blocks E, E¹, E², and it therefore follows that the stronger this current becomes the better will be the contact at these contact blocks.

Now, supposing the voltage generated in the armature decreases for any reason until it falls below the voltage of the accumulators, then a current will tend to flow from the accumulators through the circuit +T, C—C, E², E, E¹ to —T which will be in the normal direction through C—C and also a current will tend to flow through the circuit +T, B¹, A, B, D, E², E, E¹ to —T which passes in opposite direction through D to that of the normal current and produces the effect of neutralizing the magnetic attraction of the keeper F and permits the contact blocks to separate without sparking, so breaking the external circuit and preventing a further discharge of the accumulator.

I claim:—

In combination a variable speed generator comprising a shunt field circuit, a storage battery arranged to be charged thereby, and an automatic electromagnetic switch having a single operating winding arranged to control the circuit between the generator and the battery, characterized by the fact that when the switch is open said winding is connected in series with the shunt field only and when the switch is closed said winding is connected in series relation with a branched circuit comprising the shunt field circuit and the battery in parallel.

HERBERT CHARLES HUMPHREY SMYTH.

Witnesses:
 E. MAW,
 W. GUNNELL.